UNITED STATES PATENT OFFICE.

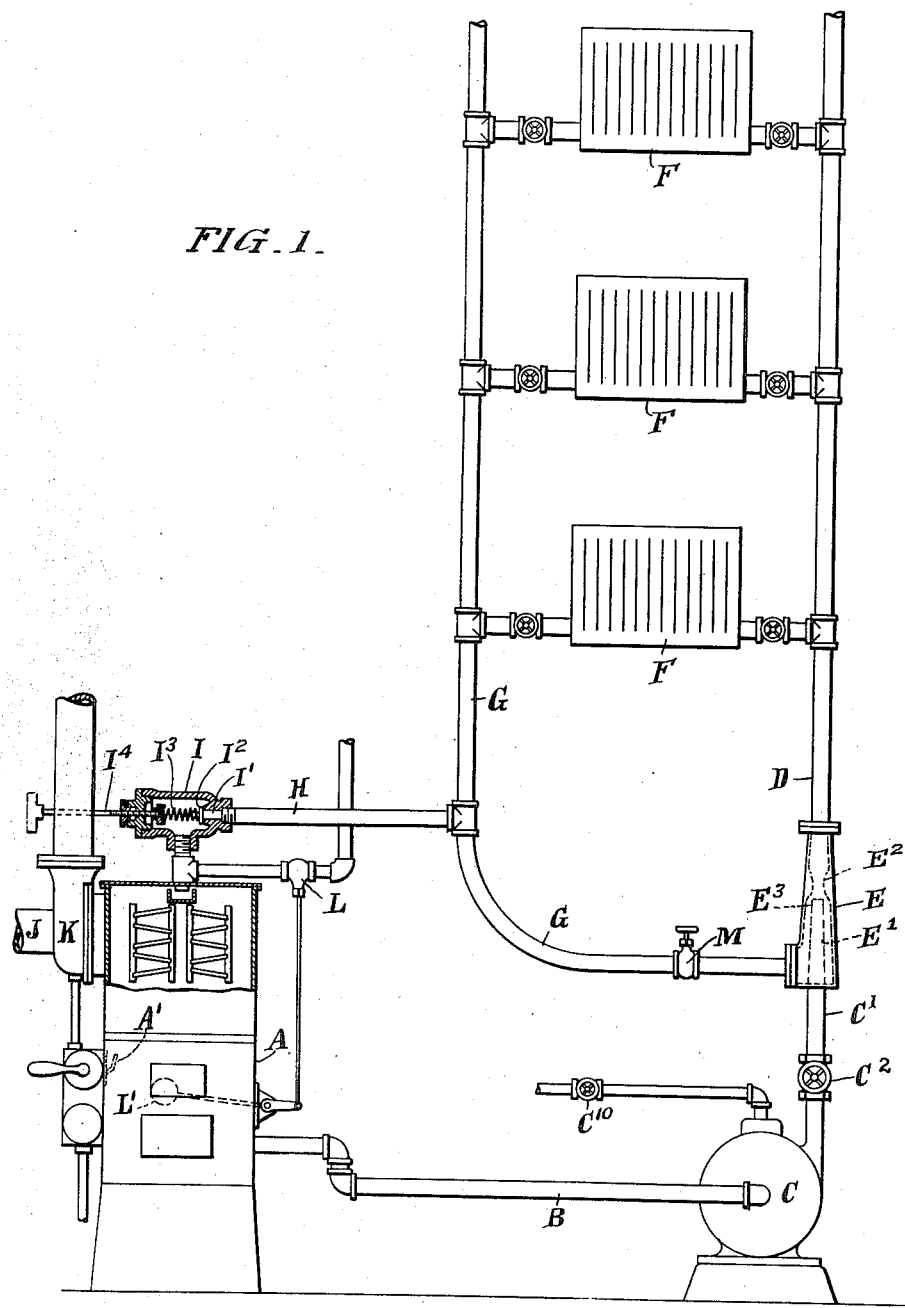

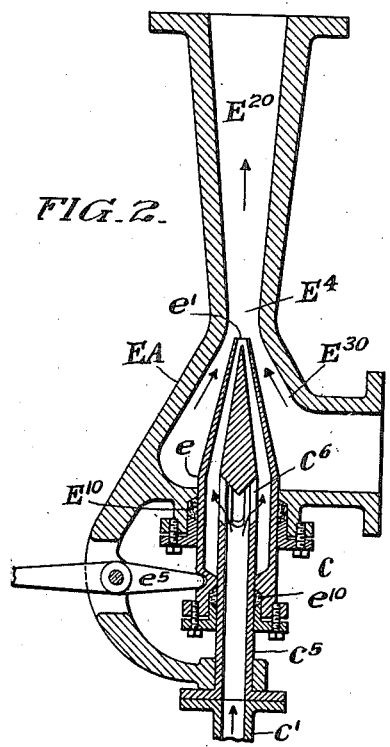
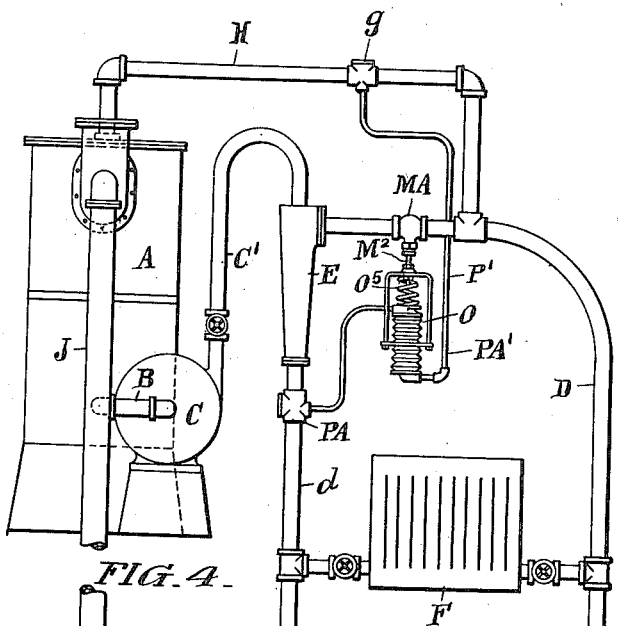
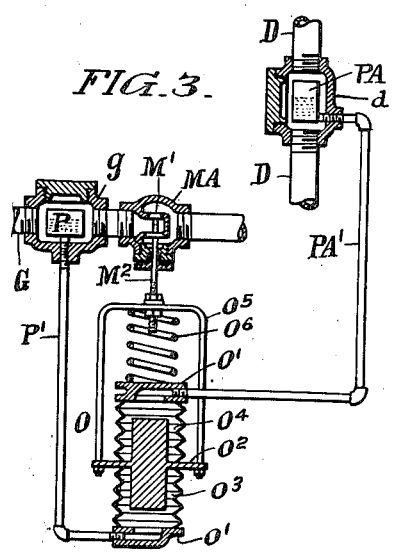
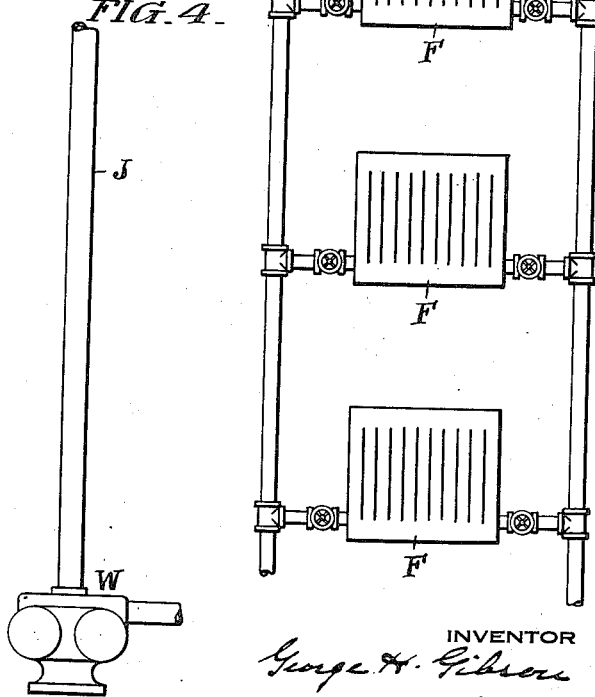

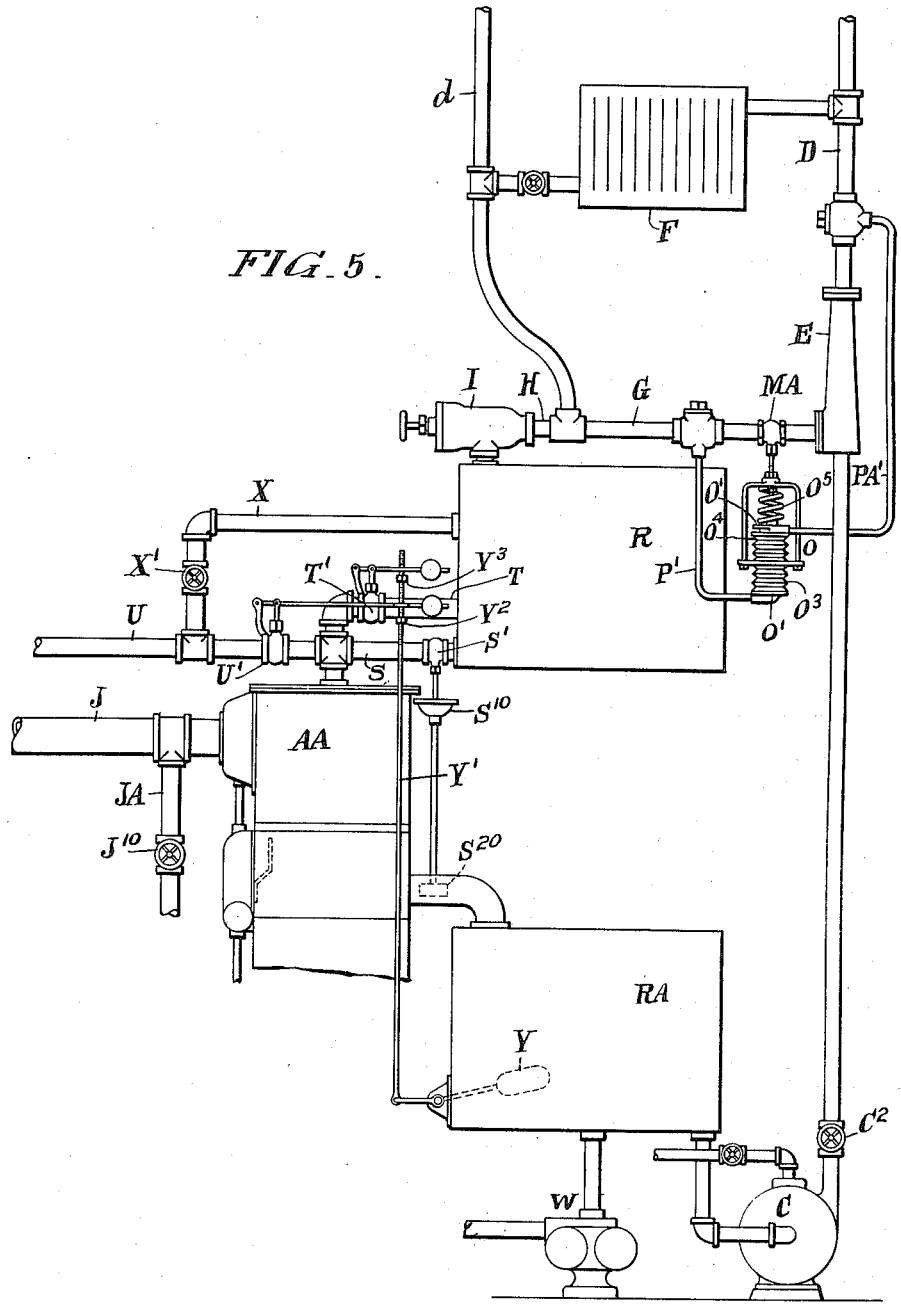

GEORGE H. GIBSON, OF MONTCLAIR, NEW JERSEY.

HEATING SYSTEM.

1,189,806. Specification of Letters Patent. Patented July 4, 1916.

Application filed January 15, 1915. Serial No. 2,308.

*To all whom it may concern:*

Be it known that I, GEORGE H. GIBSON, a citizen of the United States of America, residing in Montclair, in the county of Essex and State of New Jersey, have invented certain new and useful Improvements in Heating Systems, of which the following is a true and exact description, reference being had to the accompanying drawings, which form a part thereof.

My present invention relates to heating systems, in which the circulating medium is hot water.

The general object of the invention is the production of a simple, reliable and effective heating system, in which a heater like the well known open feed water heaters for heating boiler feed water or the like may be advantageously employed for heating the water circulated through the heating system. In an open feed water heater of the kind referred to, a heating chamber is provided into which the water to be heated and steam for heating it are both admitted, a suitable overflow connection or other means being provided to insure the presence at all times of a steam space in the upper portion of the chamber.

More specific objects of my invention are to provide a heating system of the kind referred to in which the waste of energy due to the return of the circulating water to the heating chamber, when the radiators or some part of the circulating system are located at a level substantially above the level of the heater, or when the different radiators in the system are located at different levels is minimized; and to provide such a heating system with simple and effective circulating provisions for securing the desired circulation, and for varying the temperature of the water passing through the circulating system without necessarily varying the pressure and temperature prevailing in the heater.

Another specific object of my invention is to combine in a heating system with the heating and circulating provisions employed to attain the above mentioned specific objects of my invention, simple and effective means for accumulating a supply of hot water when the available supply of steam is more than sufficient to heat the hot water then required, and for utilizing this accumulation of hot water when the available steam is less than that required to heat the hot water needed.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described forms in which my invention may be embodied.

Of the drawings: Figure 1 is a diagrammatic elevation partly in section of a preferred form of apparatus for attaining the first mentioned specific objects of my invention. Fig. 2 is a sectional elevation of an adjustable inspirator which may be employed in lieu of the one shown in Fig. 1. Fig. 3 is a sectional elevation of a portion of a system similar to that shown in Fig. 1 illustrating the use of thermostatic means for controlling the throttle valve connecting the return pipe to the inspirator. Fig. 4 represents a heating system differing from that shown in Fig. 1 in the levels at which the heater is located relatively to the radiators, and Fig. 5 is a diagrammatic representation partly in sectional elevation, of a heating system adapted for use in obtaining the last above mentioned specific object of my invention.

In the drawings and referring first to the construction shown in Fig. 1, A represents an open feed water heater from which hot water is drawn to supply the hot water heating system through the pipe B by the centrifugal pump C, the speed of which may be regulated as by means of the throttle valve $C^{10}$ in the steam supply pipe to its driving motor. The pump C discharges the water drawn from the heater through the check or non-return valve $C^2$ and pipe C' into the circulating system proper. This system, as somewhat conventionally illustrated in Fig. 1, comprises a riser pipe D, a return pipe G, a plurality of radiators F connected in the usual manner between the pipes D and G, and an inspirator E to which the pipes C', D and G are connected. The pipe C' is connected to the expansion nozzle E', the pipe D to the compression nozzle E², and the pipe G to the inlet or suction chamber E³ of the inspirator E.

It will be apparent, of course, that as water is fed into the circulating system proper from the heater by the pump C, a corresponding amount of water must be removed from the circulating system. In the system shown in Fig. 1, this excess water is removed from the circulating system and returned to the heater A through a pipe H containing a pressure regulating valve I which leads from the return pipe G to the water inlet of the heater. The valve I, as shown, comprises a casing having a valve seated port I' controlled by a puppet valve member I² which is adapted to open to permit flow through the pipe H toward the heater, but is constantly urged toward its seat by a spring I³, the tension of which may be adjusted by the threaded spindle I⁴. The tension of the spring I³ should be such that the valve will open only when subjected to a pressure corresponding to the head of water in the pipe H when the pipe G is filled with water to a height slightly above the uppermost radiator or portion of the circulating system. With this arrangement the valve I will obviously serve to return water to the heater at the rate at which it is drawn from the heater by the circulating pump C.

The heater A is supplied with steam through the pipe J and oil separator K, and is provided with an overflow connection A' limiting the height of water level in the heater, and with a valve L controlled by the float L' for supplying make up water if necessary to make up for leakage or for hot water withdrawn for any purpose, and thus maintaining a minimum height of water level in the heater. In the respects just noted the heater A does not differ in principle from the ordinary open feed water heater long known and in common use.

With the arrangement described, the total volume of flow through the pipes D, G and H will necessarily be somewhat greater than and, indeed, may be several times that of the volume of flow through the pipes B and C'. The rate at which hot water is supplied to the circulating system, and thereby the temperature in, and the heating effect of the latter may obviously be regulated, as by varying the speed of the pump C, or otherwise varying its effective capacity. The amount of water which should be passed into the circulating system from the heater by the pump C, will depend upon the temperatures which it is desired to maintain in the circulating system, and the weather and other conditions governing the radiation of heat from the circulating system. Assume, for instance, a condition in which water is passed into the circulating system through the inspirator E from the heater A at a temperature of 210° F. and is there mixed with water returned to the inspirator by the pipe G at a temperature of 140° F., in such relative amounts that the temperature of the water mixture rising in the pipe D is 160° F. Then assume a change in weather or other conditions which will result in a less rapid radiation of heat from the circulating system. This requires of course, that the rate at which hot water is withdrawn from the heater and passed through the inspirator E be reduced. A mere reduction in this rate of hot water supply will not give a desirable regulation, however, for if no other change in the operation of the system is made, than a reduction in the rate of hot water supply, the circulation through the heat radiating system, which under the conditions stated, will be directly proportional to the rate at which hot water is passed through the inspirator E, will become unduly sluggish and result in an undesirably large difference between the temperatures at which the circulating water leaves the inspirator E and the temperature in the return pipe G. To avoid an unduly sluggish circulation and an unduly large temperature differential, I provide means for increasing the amount of cold water drawn in the inspirator through the return pipe G in proportion to the amount of hot water entering the inspirator through the pipe C', as the amount of hot water supplied to the inspirator decreases. This result is accomplished with the apparatus shown in Fig. 1 by manipulation of the hand throttle valve M connected in the pipe G between the inspirator and the heater branch H. As the valve M is closed and the passage of water therethrough correspondingly throttled, the increased resistance to the flow of water into the inspirator diminishes the percentage of cold water in the mixture of the hot and cold water leaving the inspirator. Conversely as the valve M is opened and its throttling effect is reduced, the percentage of hot water in the mixture leaving the inspirator is decreased. In the apparatus shown in Fig. 1, the energy represented by the head of the water passing the valve I is lost. Inasmuch, however, as the volume of flow through the pipes C' and H is a fraction only of the total volume of flow through the circulating system proper, which is comparatively small except when the demands on the heating system are much above the average, the average loss of energy from this cause is much less than it would be if all the water returned from the radiators passed directly to the heater A.

Instead of varying the ratio of the injection water to the circulating water by throttling the return as described in connection with Fig. 1, I may obviously vary this ratio by changing the constant, so to speak, of the inspirator and in Fig. 2 I have illustrated an adjustable inspirator EA which may be used for this purpose, in lieu of the ordinary inspirator E of Fig. 1. In the inspirator EA the fixed injection water supply pipe $C'$ does not discharge directly into the suction chamber $E^{30}$, but terminates in a tubular part $C^5$ having a conical closed end and lateral ports $C^6$ discharging into a nozzle member $e$ which is telescopically mounted on the part $C^5$. The nozzle member $e$ which projects into the suction chamber $E^{30}$ of the injector EA, may be axially adjusted by the lever $e^5$ to move the discharge orifice $e'$ of the nozzle member $e$ toward or away from the restricted throat $E^4$ connecting the suction chamber $E^{30}$ and the compression nozzle $E^{20}$ of the inspirator, to thereby decrease or increase, within limits, the ratio of injection water to the water sucked out of the chamber $E^{30}$. $e^{10}$ and $E^{10}$ represent stuffing boxes to prevent leakage.

In some cases it may be desirable to provide automatic means for adjusting the ratio of injection water to circulating water in order to maintain a more or less constant temperature drop in the radiating system proper under varying conditions and in Fig. 3, I have illustrated means for accomplishing this result by a thermostatically controlled throttle valve MA located in the return pipe G as the throttle valve M is located in the return pipe G of Fig. 1. The thermostatic means for operating the valve MA shown in Fig. 3 comprises a thermostatic device O proper having stationary fixed end heads $O'$ each connected by a corresponding corrugated metallic bellows wall to an intermediate floating head $O^2$. The expansible chamber $O^3$ surrounded by one of these bellows walls is connected by a pipe $P'$ to a closed metallic receptacle located in the pipe G or rather as shown, in the enlargement $g$ thereof. Similarly a pipe PA' connects the chamber $O^4$ surrounded by the other bellows member of the thermostat O to a vessel PA located in the pipe D or in the enlarged section $d$ thereof. The connected space formed by the chamber $O^3$, pipe $P'$ and vessel P is partially filled with a suitable volatile liquid and the vapor pressure in the upper portion of the vessel P, and consequently the hydraulic pressure in the chamber $O^3$ is a function of the temperature of the water passing through the pipe G. Similarly, the space formed by the chamber $O^4$, pipe PA' and vessel PA is partially filled with a suitable volatile liquid and the vapor pressure in the vessel PA, and consequently the hydraulic pressure in the chamber $O^4$ is a function of the temperature of the water passing through the pipe D. The manner in which the pressure will vary in response to temperature to which the vessels P and PA are subjected, will depend of course, on the character of the fluids filling the chambers $O^3$ and $O^4$ and connected piping and vessels. The apparatus may advantageously be designed to operate with the fluids in each chamber and connected space consisting of water and water vapor, or water, water vapor and air. The movable partition $O^2$ is adjustably connected by a yoke $O^5$ to the stem $M^2$ of the valve MA which is a balanced valve closing and opening as its stem is moved upward and downward. The pressure in the chamber $O^4$ which normally exceeds that in the chamber $O^3$, as the temperature in vessel PA exceeds that in vessel P, is opposed in its tendency to open the valve MA not only by the pressure in the chamber $O^3$ but by the action of a suitable loading device, as for instance, the spring $O^6$ acting between the upper stationary head $O'$ and the adjustable yoke $O^5$. By adjusting the connection of the yoke $O^5$ to the valve stem $M^2$, the effective tension of the spring $O^6$ may be varied. The balance valve member $M'$ proper is arranged to open and thereby increase the flow from the pipe G as the differential of the pressures in the chambers $O^3$ and $O^4$ increases and to close under the action of the spring as this differential diminishes, and thereby diminish the flow of return water to the inspirator.

My novel means for regulating the circulation and temperature in the hot water heating system supplied by a heater of the open feed water heater type may be employed without any appreciable loss in head of the circulating water even though the radiators forming a part of the circulating system are located at widely separated levels, provided the heater is located at the level of the upper portion of the heat radiating system as shown in Fig. 4. The heater A shown in Fig. 4, as located with its water level above the level of the uppermost radiator F, is connected to the hot water circulating system proper through a circulating pump C, inspirator E and return pipe exactly as is the heater shown in Fig. 1, except that the valve I is unnecessary and is dispensed with. The throttle valve MA in the return pipe is shown as controlled by a thermostat O as shown in Fig. 3. The heater may be supplied with exhaust steam from any suitable source, as for instance, through pipe J from an engine W located in the basement of a building heated by the radiators F. In the system shown in Fig. 4, the heater A performs all the functions of the usual expansion tank of a hot water heating system.

The means for circulating hot water and controlling the temperatures prevailing in the hot water heating system described, may advantageously be combined with means for storing water so that hot water may be accumulated at times when the water heating effect of the available exhaust steam exceeds that required to provide the hot water then needed and the hot water thus stored may be effectively utilized during periods when there is not sufficient exhaust steam available to heat all the water necessary to supply the then existing demand for hot water. These conditions prevail, for instance, in a combined heating and lighting plant where the lighting load and consequently the available exhaust steam for heating water, are at a maximum in the early evening, and the demand for hot water is at a maximum in the morning when buidings are being warmed up. One installation of this character is illustrated in Fig. 5. As shown in Fig. 5, the heating system proper including the circulating pump C, inspirator E, supply and return pipes D and G, and radiators F is the same as in Fig. 1. In the system shown in Fig. 5, however, the branch H from the return pipe G including the automatic throttle valve I is not connected directly to the water inlet of the heater AA, but is connected thereto through a storage reservoir R. The heater AA as shown, moreover, has its water outlet connected to the circulating pump C through a storage tank RA. The heater AA differs from the heater A of Fig. 1 only in that it need not contain the usual hot water storage space at its lower end, since the reservoir RA serves in lieu of the hot water storage space ordinarily provided in the heater proper. The reservoir RA is shown as serving as a source of supply for a boiler feed pump W as well as for the circulating pump C of the hot water heating system.

The reservoir R, which is shown as located above the heater AA thus making it unnecessary to provide pumping means for forcing water out of this reservoir into the heater AA, is connected to the water inlet of the heater by two valved pipe connections T and S. Flow through the pipe connection S is controlled by the thermostatically actuated valve $S'$ automatically opened and closed by the expansible vessel $S^{10}$, connected to a vessel $S^{20}$ located in position to respond to the temperature of the water passing from the heater AA into the reservoir RA. This thermostatic mechanism operates to open and close the connection S as the temperature of the water leaving the heater AA rises to or falls below a predetermined temperature of, say 212°. The flow into the heater from the reservoir R through the pipe connection T is controlled by a normally closed valve $T'$. The valve $T'$ is arranged to be opened when the water in the reservoir RA falls to a predetermined low level by means of a float Y, rod $Y'$ connected thereto and stop $Y^3$ carried by the latter and engaging the operating member of the valve $T'$. Should the water in the reservoir RA fall to a still lower level, the stop $Y^2$ on the rod $Y'$ opens the valve $U'$ in a make up water supply pipe connection U to the heater AA.

JA represents a live steam connection, controlled by the hand valve $J^{10}$ by means of which live steam may be passed to the heater AA if occasion requires.

In operation the water is passed into the storage tank R from the heating system at the return temperature averaging say 140° and water is passed into the storage tank RA from the heater at the desired high temperature of say 212°. If the exhaust steam available is insufficient to heat all of the water returned to the reservoir R from the heating system to the desired high temperature, the valve $S'$ will be correspondingly shifted by its thermostatic controlling mechanism to throttle the flow into the heater, and relatively cold water will accumulate in the upper reservoir R, while water previously accumulated in the reservoir RA will be utilized and the water level in the latter correspondingly lowered. When thereafter the exhaust steam available increases sufficiently, the thermostatically controlled valve $S'$ will be open until water is permitted to flow out of the reservoir R faster than it is withdrawn from the reservoir RA. This results in lowering the water level in the cold water reservoir R and increasing the amount of hot water stored in the reservoir RA.

In case the demand for hot water exhausts the supply in the reservoir RA to such an extent that the float Y lowers, the first result is to open the valve $T'$, and on a further fall in the level of the reservoir RA which will ordinarily not occur until all the partially heated available water in the reservoir R is utilized, the valve $U'$ controlling the supply of make up water is opened. This insures an ample supply of water for the boiler feed pump W under all conditions.

X represents a connection from the cold water supply pipe to the reservoir R controlled by a hand valve $X'$ which may be opened by the attendant in case there is an excess of exhaust steam available at a time when the reservoir R is practically empty. By opening the valve $J^{10}$ in the live steam pipe connection JA provided to the heater AA, the attendant may provide steam for heating the water at a time when the supply of exhaust steam is non-existent or insufficient to heat the hot water required and the reservoir RA has become empty.

While in accordance with the provisions of the statutes I have illustrated and described the best forms of my invention now known to me, it will be apparent to those skilled in the art that changes may be made in the form of the apparatus disclosed, without departing from the spirit of my invention, and that under some conditions certain features of my invention may be used without a corresponding use of other features.

Having now described my invention, what I claim as new and desire to secure by Letters Patent, is:

1. In combination, an open water heater, a continuous water circulating, heat radiating system external to said heater, a mechanical pump connecting the heater to said circulating system at such a point in the latter that a jet of water forced into said system from the heater by the pump will flow directly through the main heat radiating portion thereof and said jet will create a volume of flow in said main portion of said circulating system greater than the volume of flow into the circulating system from said heater, and means for returning excess water to said heater from said circulating system.

2. In combination, an open water heater, a continuous water circulating, heat radiating system external to said heater, a mechanical pump and an inspirator for forcing water from said heater into said circulating system at such a point therein that the water thus forced into the circulating system will flow directly through the main heat radiating portion thereof, and a volume of flow will be created in said main heat radiating portion of said circulating system greater than the volume of flow into the circulating system through said pump, and means for returning excess water to said heater from said circulating system.

3. In combination, an open water heater, a continuous water circulating, heat radiating system external to said heater, a mechanical pump for forcing a jet of water from said heater into said circulating system at such a point therein that the water thus forced into said system will flow directly through the main heat radiating portion thereof and said jet will create a volume of flow in said main portion of said circulating system greater than the volume of flow into the circulating system from said heater, means for returning excess water to said heater from said circulating system, and means for varying the ratio between the volume of injection water and total volume of flow.

4. In combination, an open water heater, a continuous water circulating, heat radiating system external to said heater, means for forcing a jet of water from said heater into said circulating system at such a point therein that the water thus forced into said system will flow directly through the main heat radiating portion thereof and said jet will create a volume of flow in said main portion of said circulating system greater than the volume of flow into the circulating system from said heater, means for returning excess water to said heater from said circulating system, and means automatically responsive to the difference in temperature between the temperature of the water in said system immediately before and after being mixed with the water of said jet for varying the ratio between the volume of injection water, and said total volume of flow as said temperature difference varies.

5. In a hot water heating system, the combination with a continuous water circulating, heat radiating system external to said heater and storage space, means including an open water heater and a hot water storage space for heating water and storing the heated water, means for withdrawing water from said storage space and injecting the same into said circulating system, and means for discharging excess water from said circulating system and returning it to the heater, said last mentioned means including a storage space through which the water passes on its way to the heater, and means for regulating the passage of the water from the last mentioned storage space to the heater.

6. A hot water heating system comprising in combination means for heating water and a hot water storage chamber in which the water heated may be stored, a water circulating, heat radiating system supplied with hot water from said chamber, a cold water storage chamber, means for returning cooled water from said heat radiating system to said cold water storage chamber, and means independent of the accumulation of water in said cold water storage chamber for regulating the passage of the cooled water therefrom to said water heating means.

7. A hot water heating system comprising in combination means for heating water and a hot water storage chamber in which the water heated may be stored, a water circulating, heat radiating system supplied with hot water from said chamber, a cold water storage chamber, means for returning cooled water from said heat radiating system to said cold water storage chamber, means regulating the passage of cold water from said cold water storage chamber to said water heating means, and means independent of the last mentioned means for supplying water to said heating means in automatic response to a predetermined decrease in water level in said hot water storage chamber.

8. A hot water heating system comprising means for heating water and a hot water storage chamber in which the heated water may be stored, a water circulating, heat radiating system supplied with hot water from said storage chamber, a cold water storage chamber, means for returning cold water from said heat radiating system to said cold water storage chamber, and means automatically responsive to the temperature of the heated water passing to the hot water storage chamber for regulating the passage of the cold water from the cold water storage space to the water heating means.

GEORGE H. GIBSON.

Witnesses:
 PAUL A. BAUCEL,
 WM. J. FINERTY.